Figure 3:
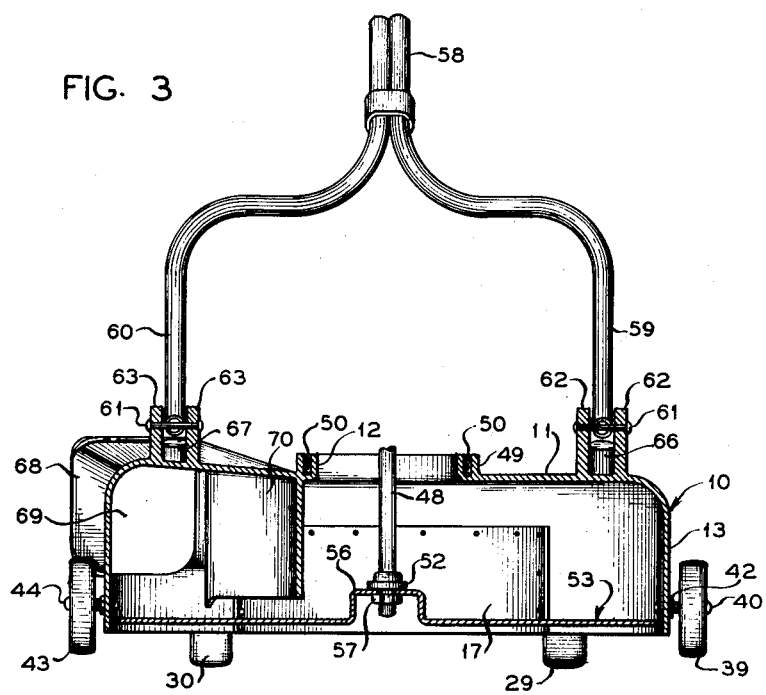

April 20, 1954          R. P. TITZER          2,675,661
DISK TYPE LAWN MOWER
Filed April 16, 1951          2 Sheets-Sheet 1
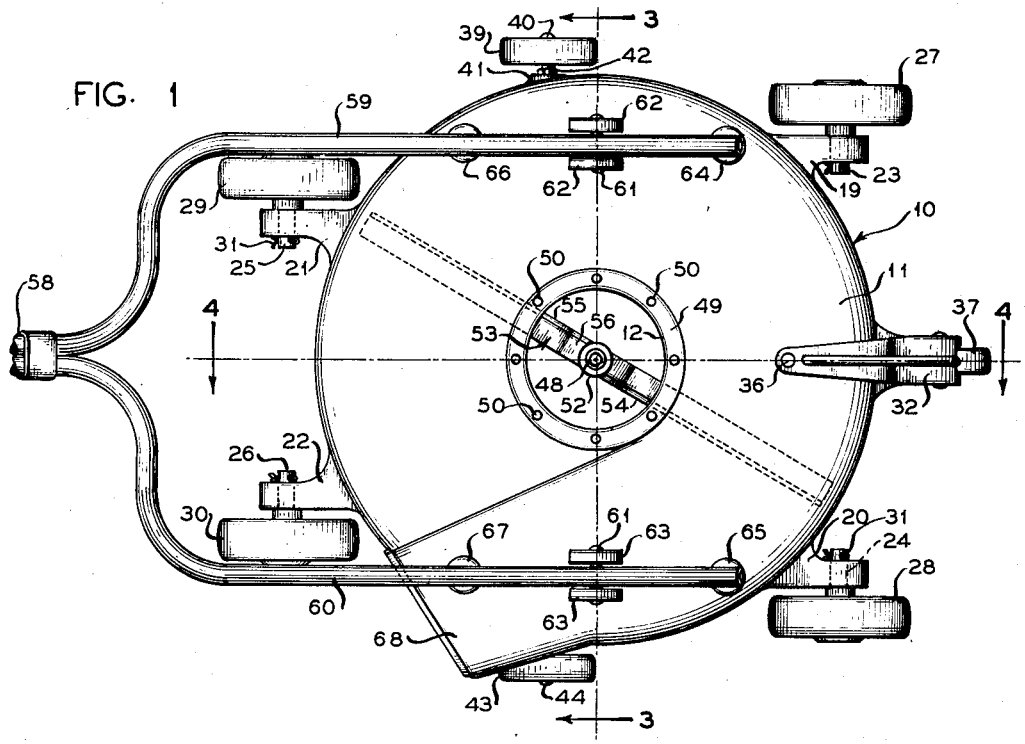
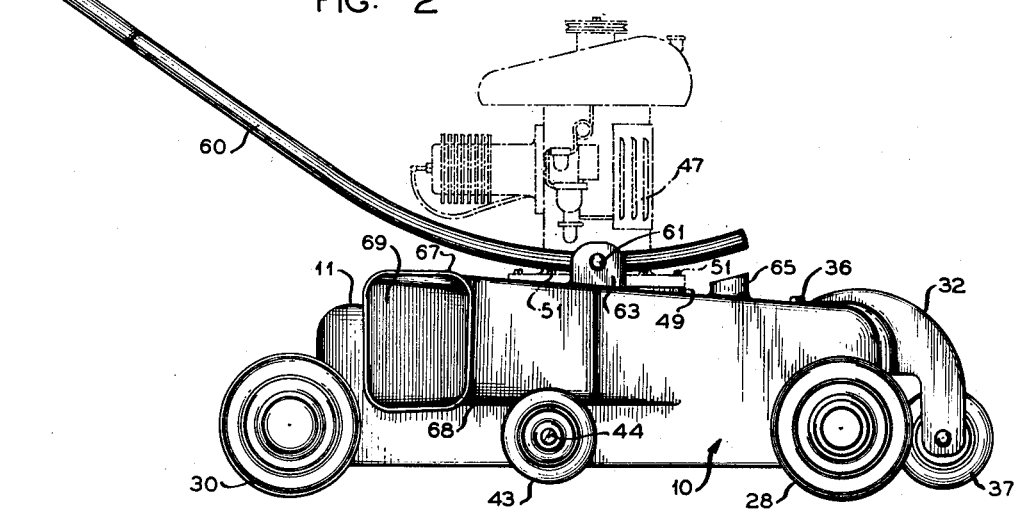
INVENTOR.
R. P. TITZER
BY
A. Yates Dowell
ATTORNEY April 20, 1954 R. P. TITZER 2,675,661
DISK TYPE LAWN MOWER
Filed April 16, 1951 2 Sheets-Sheet 2

INVENTOR.
R. P. TITZER
BY
A. Yates Dowell
ATTORNEY

Patented Apr. 20, 1954

2,675,661

UNITED STATES PATENT OFFICE 2,675,661

DISK TYPE LAWN MOWER

Raymond P. Titzer, Evansville, Ind.

Application April 16, 1951, Serial No. 221,218

4 Claims. (Cl. 56—25.4)

The present invention relates to agricultural implements, particularly those employed in performing trimming and cutting operations and specifically to a machine for cutting and trimming grass, weeds, brush or other growth and also being operative to comminute various kinds of materials, especially of vegetable or animal origin.

Heretofore various kinds of mowers have been made which have some means to space the cutters from the ground, but these mowers have permitted the cutter to engage the ground, especially when the mower was used on rough or irregular ground surface, and resulted in scraping or "skinning" the surface of the ground, thereby destroying the roots of the vegetation and producing unsightly spots in lawns and gardens. In the event the clippings were to be collected in the formerly known types of mowers foreign matter would also be collected with the clippings thereby rendering the clippings unfit for animal feeding. The mowers, prior to this invention, have been useful for a single purpose and it has been necessary for the amateur, or small scale gardener to have a plurality of machines to perform the various functions necessary for the care of lawns, gardens and the like. These mowers have been useful on level ground, but have not been satisfactory on rough or irregular ground making it necessary to use hand implements to produce a finished appearance to the lawn and making hand edge trimming necessary. The known mowers have not been satisfactory to comminute vegetable and organic matter such as leaves, humus and the like and it has been necessary to have special machines to perform each of these functions. It has also been difficult to manipulate mowers of prior design especially when an obstruction occurred in the path of movement of the mower.

An object of the present invention is to provide an agricultural machine which overcomes the objections to the machines of the prior art and to provide a machine which will serve to cut grass, weeds, brush or other material which may be standing on the ground.

Another object of the present invention is to provide a single machine which will serve the usual functions of a lawn mower as well as comminute various kinds of material such as vegetable and animal matter.

Another object of the present invention is to provide a mower which cuts the vegetation to a uniform height allowing the vegetation to remain in a substantially upright position before and after cutting.

A further object of the present invention is to provide supporting means for an agricultural machine which will normally engage the ground at a plurality of points and to provide auxiliary supporting means intermediate the first supporting means which may become operative in the event the machine is used on rough or irregular ground.

Another object of the present invention is to provide a frame with main supporting means normally engaging the ground for supporting the frame in spaced relation above the ground and to provide auxiliary supporting means having ground-engaging portions spaced above the ground-engaging portions of the main supporting means whereby the frame will be maintained in spaced relation above the ground surface regardless of the condition of the ground.

Another object of the present invention is to provide a mower which is safe to use without danger to the operator or persons coming in contact with the same.

A still further object is to provide means for varying the depth of cut of the mower, which means permits adjustment so that one side of the mower may cut deeper than the other side and or the front of the mower may cut deeper than the rear or vice versa.

Another object of the present invention is to provide adjusting means in such arrangement that any particular section of the lawn mower may be maintained in raised or lowered position relative to the ground so as to produce various types of cuts.

Another object of the present invention is to provide manipulating means for guiding the machine in its normal operation and for assisting in moving the machine from place to place without requiring lifting the entire weight of the machine.

Briefly stated the agricultural machine of the present invention comprises an open bottom housing supported at its front and rear by suitable ground-engaging means such as wheels mounted within the width dimension of the machine. Front and side auxiliary supporting means which may take the form of rollers are removably mounted on the housing intermediate the main supporting means. A cutter positioned within the housing adjacent the open bottom is mounted for rotation about a vertical axis and is adapted to cut grass, weeds, vegetation or other matter. A motor of any desired type is mounted on the housing and serves to rotate the cutter. A forked handle is pivoted to the housing for limited movement about an axis transverse to the machine to accommodate the machine to operators of different height and the same handle serves as a lever to raise the front or rear of the mower so that it readily passes over obstructions.

Further objects and advantages of the present invention will be apparent from the following description taken in conjunction with the accompanying drawings, wherein:

Fig. 1 is a top plan view of the agricultural machine of the present invention;

Fig. 2, a side elevation showing a motor in phantom view;

Fig. 3, a sectional view taken on the line 3—3 of Fig. 1; and

Figure 4:
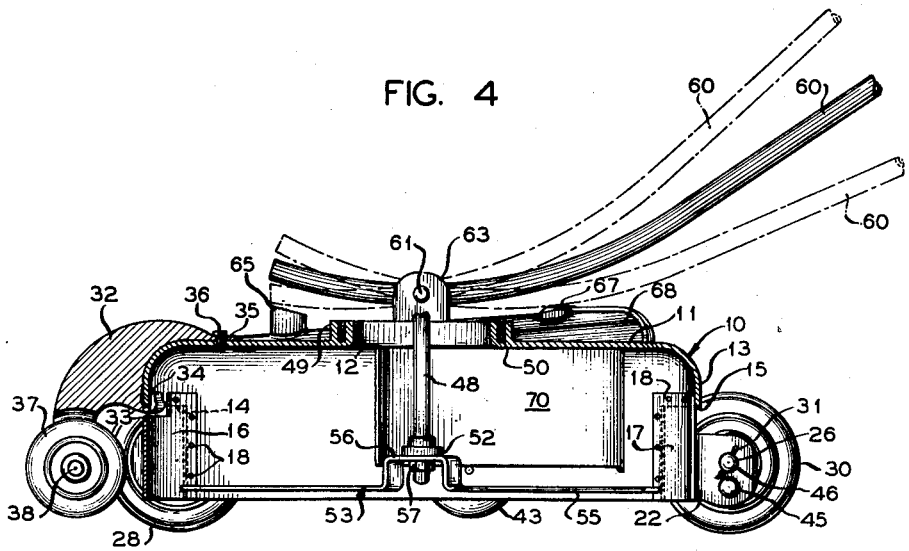

Fig. 4, a sectional view taken on the line 4—4 of Fig. 1.

With continued reference to the drawing, the agricultural machine comprises a circular open bottom housing 10 having a top 11 provided with a central opening 12 and a peripheral flange 13 having cutout portions 14, 15 at the front and rear, respectively of the casing. The top 11 serves as a floor for supporting the motor 47 and the handle 58. The flange 13 is joined to the top 11 by a smooth curved portion. Removable guard plates 16, 17 attached by any suitable means, such as screws 18, serve to close said cutout portions 14 and 15 respectively. Front lugs 19, 20 and rear lugs 21, 22 extend forwardly and rearwardly respectively from the housing 10, as clearly shown in Fig. 1, and support stub shafts 23, 24, 25 and 26, which stub shafts in turn rotatably support main ground-engaging wheels 27, 28, 29 and 30 respectively. The stub shafts are removably retained in the respective lugs by any suitable means such as cotter pins 31.

An L-shaped bracket 32 positioned at the front of the machine has an inwardly extending ledge 33 provided with a groove 34 adapted to receive the edge of the flange 13 at the upper portion of cutout 14 and said bracket at one end is provided with an aperture 35 for receiving a bolt 36 threadedly engaging the top 11 of the housing. The bracket 32 is thereby removably held in fixed relation to the front of the housing. The other end of the bracket 32 is bifurcated to receive a front auxiliary ground-engaging means which may be a roller 37 which is rotatably mounted on shaft 38 within the recess formed by the bifurcations. A further auxiliary ground-engaging means may take the form of a roller 39 rotatably supported on stud 40 removably secured to a boss 41 on the housing 10 by any suitable means such as screw-threads. A locknut 42 may serve to lock the stud 40 to the housing. Another ground engaging means, such as a roller 43, is similarly rotatably supported on the other side of the housing on stud 44. It will be noted that ground-engaging wheels 39 and 43 are arranged on a transverse axis spaced rearwardly from the transverse diameter of the housing. The ground-engaging points of rollers 37, 39 and 43 are spaced above the ground-engaging points of the wheels 27, 28, 29 and 30 and are normally inoperative, but in the event the machine is passed over rough or irregular ground, these rollers may engage the irregularities to prevent the ground from coming in contact with the housing or the cutting blade therein.

Referring to Fig. 4, it will be noted that rear lug 22 is provided with bores 45, 46 which may receive stub shaft 26 for varying the relation between roller 30 and the housing 10. By inserting the stud shaft 26 in the lower bore 45 the depth of cut will be reduced and the grass, weeds, and other material being cut will be allowed to have greater height. Bores similar to those at 45, 46 in lug 22 are provided on the other lugs 19, 20 and 21 so that the wheels supported thereby may be adjusted for varying the depth of cut. If the wheels 28 and 30 are arranged in the upper bores the grass will be cut to a greater depth at the right side of the mower. If the wheels 27 and 29 are mounted with their stub shafts in the lower bore of the corresponding lugs, the material would be cut to a lesser depth and it will thus be seen that the mower may serve to cut a swath leaving different heights of the grass or weeds on different portions of the swath. Also it is possible to arrange diagonally opposite wheels such as wheels 29 and 28 in different bores 46 and 45 so as to produce an askew cutting action. In another adjustment the front wheels 27, 28 may be arranged in the upper bores 46 and the rear wheels 29, 30 may be arranged in the lower bores 45, or vice versa, to produce a different type of cutting action. A motor, shown in phantom view at 47 in Fig. 2, carries a driven shaft 48 and is mounted on flange 49 having tapped openings 50 to receive threaded studs 51 for securing the motor to the housing. The lower end of shaft 48 is provided with a collar 52 fixed to the shaft. A cutter blade 53 having cutting edges 54, 55 is provided with an offset 56 through which shaft 48 passes. The cutter blade is fixed to the shaft by suitable means such as a locknut 57 and or a key. The motor 47 is designed to produce clockwise rotation of shaft 48, as shown by the arrow in Fig. 1 to cause the cutting edges 54, 55 to engage the grass, weeds or other matter for cutting or comminuting the same. A bifurcated handle 58 having legs 59, 60 curved at their free extremity, as shown in Figs. 2 and 4, and pivoted at 61 to spaced upstanding ribs 62, 63, respectively, positioned on the top 11 of the housing on the transverse diameter thereof serves to guide the machine. Front stops 64, 65 and rear stops 66, 67 are arranged forwardly and rearwardly of the upstanding ribs for engagement with portions of the legs of the handle 58. It will thus be seen that the pivoted handle 58 provides for limited adjustment so that the mower may be used by persons of different height without modification. The handle is adapted to be depressed so as to engage the rear stops 66, 67 to pivot the entire machine about rear wheels 29, 30 so as to lift the front of the machine upwardly for passage over large obstructions. Similarly, upon raising the handle, the legs 59, 60 engage front stops 64, 65 to limit the relative movement of the handle with respect to the housing whereby further raising of the handle causes the housing to pivot about front wheels 27, 28 for raising the rear of the mower for passage over large obstructions at the rear thereof. For collecting the clippings or comminuted particles produced by the mower, the casing 13 is provided with an outwardly extending conduit 68 having a passage 69 communicating with the interior of the housing and extending toward the side and rear thereof. The conduit 68 is adapted to be surrounded by a bag or other suitable container for collecting the comminuted particles. Baffle plate 70 extending from the central portion of the housing adjacent opening 12 to the conduit 68 guides the cut material into the conduit.

From the above description, the operation of the agricultural machine will be evident. However, to more clearly indicate its operation and some of its uses, a further statement of some of its functions is made.

The operator may move the machine from one location to another by manipulation of the handle 58 to lift the rear wheels in the event an obstruction, such as a stair step, must be passed over between the storage location of the machine and the garden in which it is to be used. By suitable manipulation of the handle the mower may be moved up or down a plurality of steps as necessity requires.

In cutting grass or weeds the motor is operated to produce a suitable speed of rotation of the cutter blade 53 and the machine is passed over the area to be trimmed. In the event that ridges are encountered, the auxiliary rollers 37, 39 and 43 may engage the ridges to prevent the housing and the cutter blade from engaging the ground surface, thereby preventing "skinning" and the production of unsightly spots in the garden. When it is desired to cut a lawn close to a side obstruction, the auxiliary roller 39 is removed by loosening locknut 42 and unscrewing stud 40 from the housing. That side of the mower may then be moved along the obstruction for cutting close to the obstruction, whereby little or no hand trimming is necessary. It will be noted that wheels 27, 28, 29 and 30 are within the width of the mower to allow this close side cutting. Also, the boss 41, which supports stud 40, being behind the transverse diameter of the housing is within the width dimension of the mower and, therefore, does not interfere with this operation.

The front auxiliary roller 37 is removable from the housing by removing bolt 36 and removing the bracket 32 from the housing. The mower may then be moved forwardly into close engagement with an obstruction, such as a pole which may be in front of the mower for close cutting adjacent the obstruction.

Guard plates 16, 17 are normally held in position by screws 18 and prevent any person coming into contact with the rotary cutting blade 53 during the normal operation thereof. However, under some conditions it is desirable to remove these guard plates 16, 17 so that somewhat longer and stiffer vegetation may pass into the housing to be cut. With the guard plates 16 and 17 in position the outer blade 53 is entirely within the housing and there is no danger of injury. It will be apparent that the machine may be used for comminuting material already cut loose from the ground such as grass, weeds, branches, etc. The machine is suitable for comminuting dried leaves, or other matter, by merely passing the operating machine over some of the material. Further, by having the cutting blade arranged higher at the front than at the rear of the mower by suitably mounting the front stub shafts 23, 24 in the lower bores 45 of the lugs 19, 20 a less deep cut is made at the front than at the rear making the machine adaptable for comminuting relatively deep piles of vegetable or humus-containing matter. Similarly, by mounting the stub shafts of the rear wheels in the lower bores of the rear lugs a similar result may be obtained when moving the mower rearwardly.

It will be obvious to those skilled in the art that various changes may be made in the invention without departing from the spirit and scope thereof and, therefore, the invention is not limited to that which is shown in the drawings and described in the specification but only as indicated in the appended claims.

What is claimed is:

1. In a mower of the horizontally rotating cutter type, wherein is provided a source of power having a vertically disposed shaft and a horizontal cutter on the lower portion thereof, a mobile housing supporting said source of power, said housing having a floor portion and a depending peripheral flange with an opening in one side thereof, said shaft extending through said floor, and said cutter being located at a point spaced below said floor, a depending baffle extending downwardly from said floor to a plane above that of said cutter, and from the periphery of said floor at a point adjacent one side of said opening to a point adjacent the center of said floor, whereby to form a discharge opening for material cut by said cutter.

2. The invention according to claim 1 in which ground engaging wheels are mounted forwardly and rearwardly of the housing within the width dimension of the housing and auxiliary wheels are mounted at the sides of the housing, said ground engaging wheels being vertically adjustable and said auxiliary wheels being normally above the ground.

3. The invention according to claim 2 in which a roller is removably mounted on the front of the housing between the forward ground engaging wheels, said roller being normally above the ground.

4. The invention according to claim 1 in which forward and rearward pairs of ground engaging wheels are mounted on the housing within the width dimension of the housing and a bifurcated handle is mounted on said housing with each leg pivoted to the housing at a point spaced from the end of said leg and each leg may engage the housing so that the forward or rear end of the lawn mower may be raised by downward movement or upward movement respectively of the free end of the handle.

References Cited in the file of this patent

UNITED STATES PATENTS

| Number | Name | Date |
|---|---|---|
| 1,404,631 | Molesworth | Jan. 24, 1922 |
| 1,899,564 | Frey | Feb. 28, 1933 |
| 2,485,729 | Gentry | Oct. 25, 1949 |
| 2,523,439 | May | Sept. 26, 1950 |
| 2,578,880 | Doyle | Dec. 18, 1951 |

FOREIGN PATENTS

| Number | Country | Date |
|---|---|---|
| 865,385 | France | Feb. 24, 1941 |